United States Patent
Schramm et al.

(10) Patent No.: US 12,422,357 B2
(45) Date of Patent: Sep. 23, 2025

(54) CHAMBER MOISTURE CONTROL USING NARROW OPTICAL FILTERS MEASURING EMISSION LINES

(71) Applicant: Applied Materials, Inc., Santa Clara, CA (US)

(72) Inventors: Sven Schramm, Kahl am Main (DE); Martin Hilkene, Gilroy, CA (US); Elias Martinez, San Jose, CA (US); Amir Bayati, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 153 days.

(21) Appl. No.: 18/197,868

(22) Filed: May 16, 2023

(65) Prior Publication Data

US 2024/0385109 A1   Nov. 21, 2024

(51) Int. Cl.
*G01N 21/3577* (2014.01)
*G01N 21/25* (2006.01)
*G01N 21/64* (2006.01)

(52) U.S. Cl.
CPC ....... *G01N 21/3577* (2013.01); *G01N 21/255* (2013.01); *G01N 2021/6471* (2013.01); *G01N 2201/0238* (2013.01)

(58) Field of Classification Search
CPC ......... G01N 2021/6471; G01N 21/255; G01N 21/33; G01N 21/3577; G01N 21/68; G01N 2201/0238
See application file for complete search history.

(56) References Cited

U.S. PATENT DOCUMENTS

| | | | |
|---|---|---|---|
| 5,886,348 A | 3/1999 | Lessure et al. | |
| 2004/0179187 A1 | 9/2004 | Mettes | |
| 2006/0238741 A1* | 10/2006 | Ninomiya | G01J 3/44 382/106 |
| 2017/0254755 A1* | 9/2017 | Cho | G01J 3/0208 |
| 2017/0314991 A1* | 11/2017 | Meng | G01N 21/68 |
| 2018/0038800 A1 | 2/2018 | Gamache | |
| 2020/0132573 A1* | 4/2020 | Badiei | B01F 29/40362 |
| 2021/0096059 A1* | 4/2021 | Ehring | G01N 21/33 |

FOREIGN PATENT DOCUMENTS

| | | |
|---|---|---|
| EP | 3777682 A1 | 2/2021 |
| JP | 2011179942 A | 9/2011 |

OTHER PUBLICATIONS

International Search Report and Written Opinion from PCT/US2024/025252 dated Aug. 8, 2024, 9 pgs.

* cited by examiner

*Primary Examiner* — Hina F Ayub
(74) *Attorney, Agent, or Firm* — Schwabe, Williamson & Wyatt, P.C.

(57) ABSTRACT

Embodiments disclosed herein include a moisture detection module. In an embodiment, the moisture detection module comprises an optical bandpass filter configured to be optically coupled to a light source, where a passband is centered at 309 nm. In an embodiment, the moisture detection module further comprises a detector optically coupled to the optical bandpass filter.

10 Claims, 10 Drawing Sheets

CHAMBER MOISTURE CONTROL USING NARROW OPTICAL FILTERS MEASURING EMISSION LINES

BACKGROUND

1) Field

Embodiments relate to the field of semiconductor manufacturing and, in particular, modules for detecting moisture content within a chamber using narrow bandpass optical filters.

2) Description of Related Art

During a maintenance event in a semiconductor processing tool, the tool may be opened up to atmosphere. Opening the processing tool may result in moisture entering the processing tool. A high moisture level is a key issue preventing the process from starting after maintenance. For example, moisture can react with $SiH_4$ and generate dust that can cause contamination. Accordingly, sophisticated and time-consuming pump down procedures are used to make sure that any remaining moisture will not influence production processes. Typically, pump down procedures are ran for longer than the time frame expected to clear the moisture in order to ensure moisture is properly removed from the chamber. This leads to a longer period of time between a maintenance event and the return to processing production substrates.

Other techniques for monitoring moisture are available, but they are expensive. For example, measurement techniques such as the use of a mass spectrometer or infrared absorption may be used. However, these techniques either are too expensive for use in many tools, or the techniques do not operate at the low pressures present in semiconductor processing tools.

SUMMARY

Embodiments disclosed herein include a moisture detection module. In an embodiment, the moisture detection module comprises an optical bandpass filter configured to be optically coupled to a light source, where a passband is centered at 309 nm. In an embodiment, the moisture detection module further comprises a detector optically coupled to the optical bandpass filter.

Embodiments disclosed herein further comprise a semiconductor processing tool. In an embodiment, the tool comprises a chamber, and a viewport through a wall of the chamber. In an embodiment, a detection module is optically coupled to the viewport. In an embodiment, the detection module comprises an optical bandpass filter with a passband that is up to 10 nm and a detector optically coupled to the optical bandpass filter.

Embodiments disclosed herein also comprise a method for detecting moisture in a chamber. In an embodiment, the method comprises initiating a plasma in the chamber, and passing electromagnetic radiation through a port in the chamber. In an embodiment, the method further comprises filtering the electromagnetic radiation with a bandpass filter with a passband that is 10 nm wide or smaller, and detecting the filtered electromagnetic radiation with a photodiode.

DETAILED DESCRIPTION

Figure 1A:
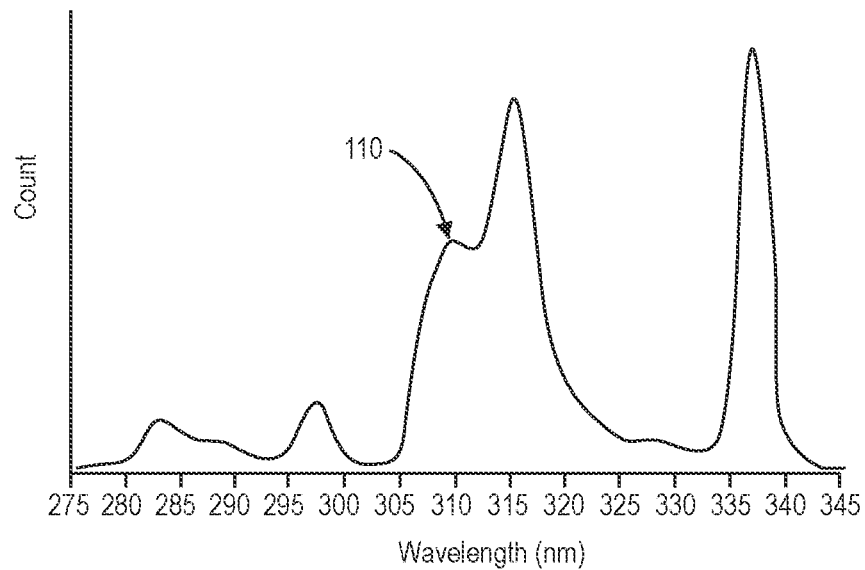
FIG. 1A is a graph of the emission spectrum of a plasma in a semiconductor processing tool, in accordance with an embodiment.

Systems described herein include modules for detecting moisture content within a chamber using narrow bandpass optical filters. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Maintenance events for semiconductor processing tools are expensive processes. This is because the chamber is often opened up to atmosphere (e.g., during a cleaning process). Opening the chamber to atmospheric conditions often results in moisture being introduced to the chamber. Moisture in the chamber can negatively impact processing of wafers or substrates. For example, the moisture can interact with $SiH_4$ and generate dusts that can contaminate wafers or substrates. Processes, such as a pump down, are used in order to clear the moisture from the chamber.

Determining when the moisture is adequately cleared is not a simple process. For example, measurement techniques such as the use of a mass spectrometer or infrared absorption may be used. However, these techniques either are too expensive for use in many tools, or the techniques do not operate at the low pressures present in semiconductor processing tools. Therefore, the pump down process is typically run for durations that are longer than otherwise necessary in order to ensure that the moisture is removed. This longer duration results in more down time, and further increases the expense of running a maintenance event.

Accordingly, embodiments disclosed herein include a moisture detection tool that can be used in combination with the semiconductor processing tool. In an embodiment a light source within the chamber (e.g., a plasma) may be passed through a narrow bandpass filter. The bandpass filter may be centered at a wavelength that is known to correspond with moisture. For example, it has been shown that the wavelength of 309 nm belongs to OH, which is generated by cracking the water molecule. The intensity of this feature can be used as an indicator for the moisture content in the semiconductor processing tool.

The use of a narrow bandpass filter effectively filters out other wavelengths and provides a simple optical signal for processing. For example, the detector may be a simple detector compared to expensive spectrometer solutions. In a particular embodiment, the detector may be a photodiode. Since the other wavelengths are filtered out, the intensity detected by the photodiode can be directly correlated to the moisture content within the semiconductor processing tool.

In yet another embodiments, additional bandpass filters may be used to detect other wavelengths of interest. For example, nitrogen intensity, oxygen intensity, or the like may be detected by setting up a second bandpass filter and a second detector. In some embodiments, a reference signal may also be used. The references signal may be detected by a detector without a bandpass filter between the light source and the detector.

Embodiments disclosed herein may also include various architectures that can be used to improve signal propagation. For example, one or more lenses may be used to focus electromagnetic radiation. Also, fiber optic cables may be used in some embodiments.

Further, embodiments disclosed herein may be used in chambers that do not include a dedicated light source (e.g., a plasma). For example, transfer chambers, load locks, and the like may include sensor solutions. In a particular embodiment, an antechamber may be fluidically coupled to the main chamber. The antechamber may include functionality for forming a plasma. This plasma in the antechamber can be used for moisture detection similar to embodiments described in greater detail above.

Referring now to FIG. 1A, a graph of the spectrum of a plasma in a semiconductor processing tool is shown, in accordance with an embodiment. The spectrum may include peaks that indicate the presence of one or more different elements in the chamber. For example, peaks in FIG. 1A may correspond to nitrogen in some embodiments. More particularly, the side peak or shoulder 110 may correspond to moisture within the chamber. The shoulder 110 may represent the presence of OH in the chamber, which is generated by the cracking of a water molecule. The shoulder 110 may be centered at a wavelength of around 309 nm. As such, the increase or the decrease of the intensity of the shoulder 110 can be used in order to detect the moisture content within the chamber.

However, looking at the entire spectrum results in large amounts of data and complex systems. For example, the entire spectrum can be provided by a spectrometer tool, or the like. Unfortunately, spectrometers and other similar sensing tools are expensive, and may not be cost effectively integrated with a semiconductor processing tool. Further, in cluster tool architectures, each chamber may need its own moisture detection setup. For larger cluster tools, this added functionality quickly increases the cost and complexity of the cluster tool.

Figure 1B:
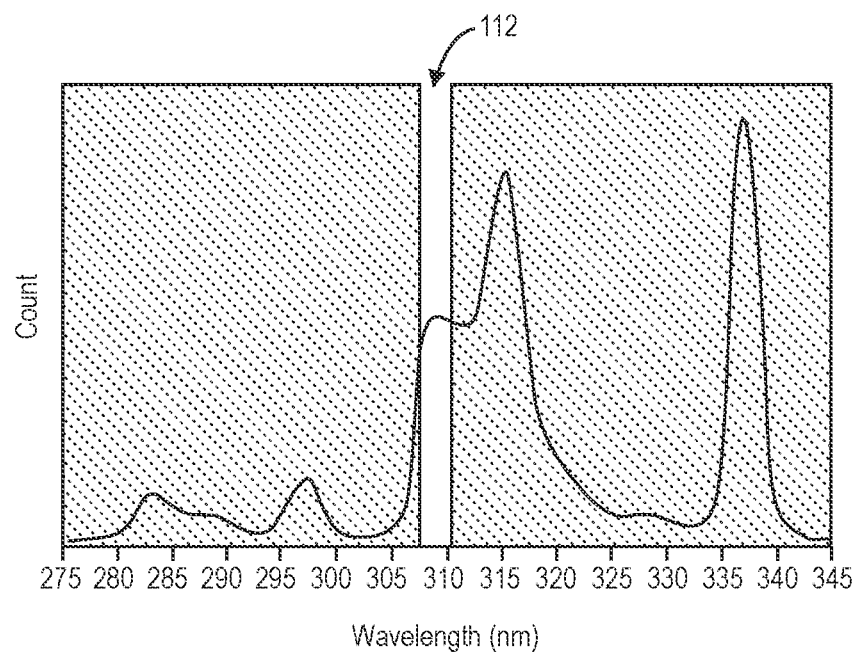
FIG. 1B is a graph of the emission spectrum with a narrow bandpass filter that is centered on a region associated with moisture, in accordance with an embodiment.

Accordingly, embodiments disclosed herein include narrow bandpass filters in order to filter the spectrum to provide only the regions of importance. An example of such a bandpass filter 112 is shown in FIG. 1B. In FIG. 1B, the shaded regions are regions of the spectrum that are filtered out. As shown, the bandpass filter 112 is centered around the wavelength of interest (e.g., 309 nm for the detection of OH). Though, it is to be appreciated that other wavelengths of interest may also be used in some embodiments. The bandpass filter 112 may have a passband that is approximately 10 nm or less, approximately 5 nm or less, or approximately 1 nm or less. In an embodiment, a full width at half maximum (FWHM) may range from 1 nm to 20 nm. For example, the FWHM is 1 nm, 2 nm, 4 nm, or 10 nm. Due to the narrow passband, a relatively simple detector may be used to determine moisture level. For example, the detector may be a simple photodiode. Since all other wavelengths are filtered out, the intensity detected by the photodiode can be attributed to the wavelength of interest.

Figure 1C:
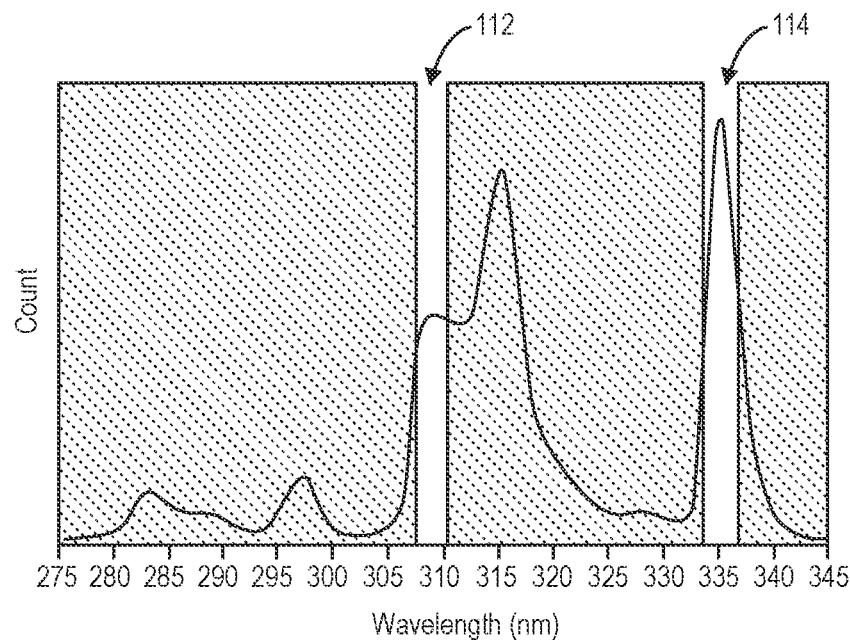
FIG. 1C is a graph of the emission spectrum with a pair of narrow bandpass filters centered on a region associated with moisture and a region associated with nitrogen, in accordance with an embodiment.

Referring now to FIG. 1C, a graph of the filtered spectrum is shown, in accordance with an additional embodiment. As shown, multiple bandpass filters are included. For example, a first bandpass filter 112 may be provided for OH at 309 nm, and a second bandpass filter 114 may be provided at a different wavelength. For example, the bandpass filter 114 may be centered at 335 nm. 335 nm may correspond to nitrogen in some embodiments. The first bandpass filter 112 and the second bandpass filter 114 may have passbands with a similar width (e.g., 5 nm or less). In other embodiments, the passband of the first bandpass filter 112 may be wider or narrower than the passband of the second bandpass filter 114. While two bandpass filters 112 and 114 are shown, it is to be appreciated that any number of bandpass filters can be used to provide readings of different portions of the spectrum. For example, a bandpass filter may be centered at 777 nm in order to detect oxygen content. More generally, bandpass filters can be used to detect air leaks (e.g., $O_2$ or $N_2$). For example, bandpass filters can be centered at 244.8 nm, 315.93 nm, 337.13 nm, 357.69 nm, 375.54 nm, 380.49 nm, 399.84 nm, 639.47 nm, 646.85 nm, 654.48 nm, 662.36 nm, 777 nm, 844 nm, 891.24 nm, or 1051.00 nm.

Due to complex interactions between gasses, the use of only bandpass filters may not be enough to determine concentrations of various elements. For example, if clearly separated lines are not present, a more complex algorithm can be used to calculate individual intensities based on several overlapping lines. Possible calculation options may include solving a system of equations, or a calculation based on previously measured characteristic curves.

Figure 2A:
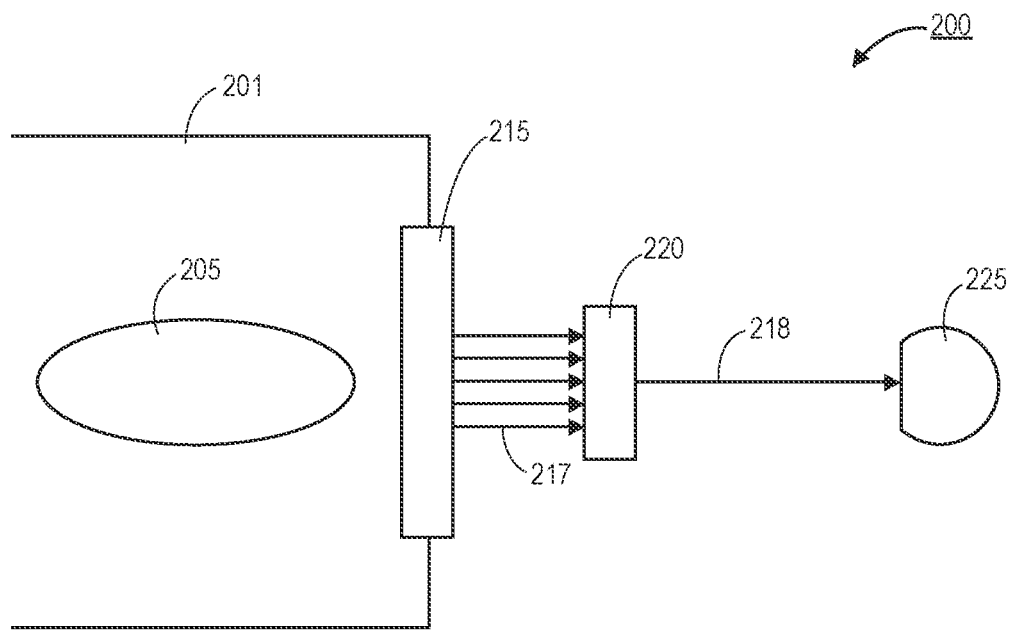
FIG. 2A is an illustration of a semiconductor processing tool with a moisture detection system that includes a narrow bandpass filter and a detector, in accordance with an embodiment.

Referring now to FIG. 2A, a cross-sectional illustration of a semiconductor processing tool 200 is shown, in accordance with an embodiment. In an embodiment, the semiconductor processing tool 200 may comprise a chamber 201. The chamber 201 may be suitable for supporting sub-atmospheric pressures. That is, the chamber 201 may be a vacuum chamber. In a particular embodiment, the chamber 201 may comprise functionality to generate a plasma 205 within the chamber 201.

In an embodiment, the chamber 201 may include a viewport 215. The viewport 215 may be made of a material that is transparent to the wavelengths of electromagnetic radiation of interest. In a particular embodiment, the viewport 215 may comprise fused silica or the like. In an embodiment, unfiltered electromagnetic radiation 217 may be emitted by the plasma 205 and propagated out of the viewport 215. For example, a set of five lines of electromagnetic radiation 217 are shown to indicate that the electromagnetic radiation 217 is unfiltered broad band electromagnetic radiation.

In an embodiment, the electromagnetic radiation 217 is propagated to a narrow bandpass filter 220. The bandpass filter 220 may be similar to any of the bandpass filters described in greater detail above. For example, the bandpass filter 220 may have a passband with a width of 10 nm or less, 5 nm or less, or 1 nm or less. In a particular embodiment, the passband of the bandpass filter 220 is centered on a wavelength corresponding to the presence of moisture. For example, the bandpass filter 220 may be centered on a wavelength of approximately 309 nm in order to detect the presence of OH from cracked water molecules. The bandpass filter 220 may be any type of optical filter that can have a passband centered at a particular wavelength of electromagnetic radiation.

In an embodiment, the bandpass filter 220 may be optically coupled to a detector 225. As shown, filtered electromagnetic radiation 218 propagates from the bandpass filter 220 to the detector 225. A single line is shown for the electromagnetic radiation 218 in order to indicate that it is filtered compared to the wider bandwidth (more lines) of electromagnetic radiation 217. In an embodiment, the detector 225 may be any detector suitable for converting an electromagnetic radiation intensity to an electrical signal. For example, the detector 225 may be a photodiode or the like. Since the electromagnetic radiation 218 is filtered, the intensity detected by the photodiode detector 225 can be correlated to the species of interest (e.g., OH or moisture).

In an embodiment, the light source (e.g., plasma 205) is said to be optically coupled to the bandpass filter 220, and the bandpass filter 220 is said to be optically coupled to the detector 225. As used herein, "optically coupled" refers to two or more components that are configured to be in a position to have electromagnetic radiation propagate from one component to another component. For example, electromagnetic radiation 217 propagates from plasma 205 to the bandpass filter 220, and electromagnetic radiation 218 propagates from the bandpass filter 220 to the detector 225. In the illustrated embodiment, the components do not including any focusing lenses, mirrors, or the like. Though, in other embodiments, two optically coupled components may have one or more lenses and/or one or more mirrors between the two optically coupled components.

Figure 2B:
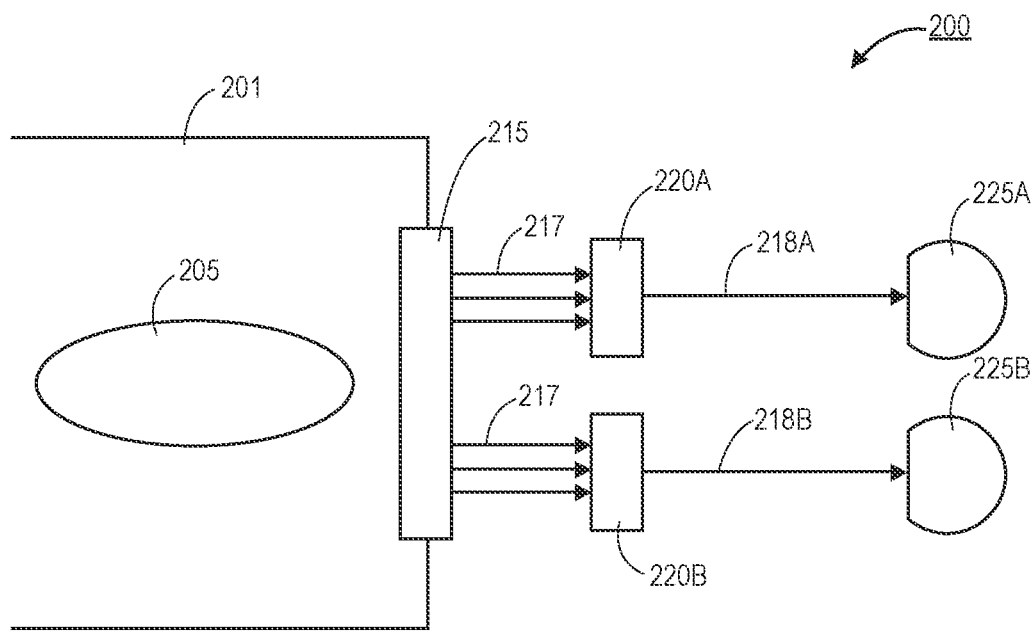
FIG. 2B is an illustration of a semiconductor processing tool with a moisture detection system that includes a pair of narrow bandpass filters and a pair of detectors, in accordance with an embodiment.

Referring now to FIG. 2B, a cross-sectional illustration of a semiconductor processing tool 200 is shown, in accordance with an additional embodiment. In an embodiment, the semiconductor processing tool 200 in FIG. 2B may be similar to the semiconductor processing tool 200 in FIG. 2A, with the addition of a second optical path. For example, a first bandpass filter 220A and a second bandpass filter 220B may be provided. The first bandpass filter 220A may be optically coupled to a first detector 225A, and the second bandpass filter 220B may be optically coupled to a second detector 225B.

In an embodiment, the first bandpass filter 220A may be centered at a first wavelength, and the second bandpass filter 220B may be centered at a second wavelength that is different than the first wavelength. As such, two different peaks of a spectrum can be analyzed at the same time. For example, the first wavelength may be centered at 309 nm (e.g., to look for OH), and the second wavelength may be centered at 335 nm (e.g., to look for N). This provides first filtered electromagnetic radiation 218A to the first detector 225A and second filtered electromagnetic radiation 218B to the second detector 225B. While two filtering and detection sets are shown, it is to be appreciated that any number of filtering and detection sets may be used in accordance with embodiments described herein.

Figure 2C:
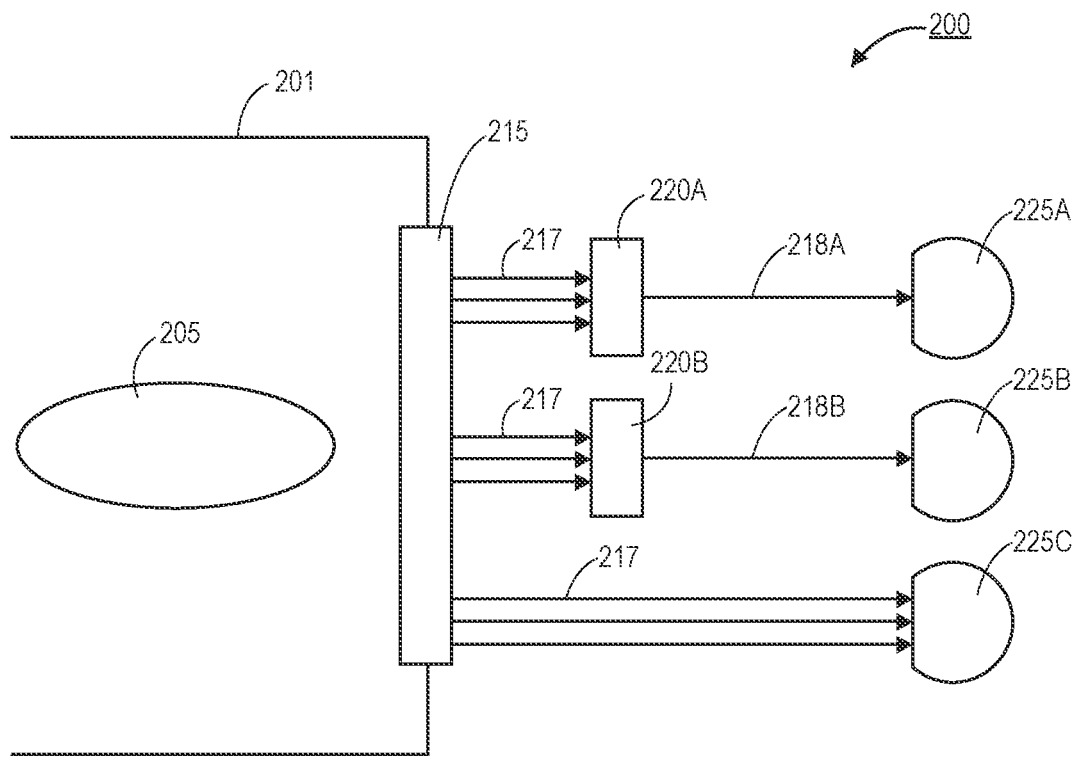
FIG. 2C is an illustration of a semiconductor processing tool with a moisture detection system that includes a pair of narrow bandpass filters and a set of three detectors, in accordance with an embodiment.

Referring now to FIG. 2C a cross-sectional illustration of a semiconductor processing tool 200 is shown, in accordance with an additional embodiment. The semiconductor processing tool 200 in FIG. 2C may be substantially similar to the semiconductor processing tool 200 in FIG. 2B, with the addition of a reference line. The use of a reference line may be used in order to calibrate the signals detected by the other detectors 225A and 225B. For example, a third detector 225C may be directly optically coupled to the viewport 215 without an intervening bandpass filter. That is, electromagnetic radiation 217 from the plasma 205 may pass through the viewport 215 and be directly provided to the third detector 225C.

The use of such a reference signal may be used in order to calibrate readings in order to account for aging of the viewport 215. For example, material may be deposited onto the interior surface of the viewport 215, which reduces transmission through the viewport 215. When the reference signal detected by the third detector 225C decreases, the other detectors can be calibrated to account for the lower transmission rates. Otherwise, without calibration, as the viewport 215 deteriorates (e.g., becomes dirty), the readings at the first detector 225A and the second detector 225B will be lower. This can lead to misreporting the moisture content within the chamber 201.

Figure 3A:
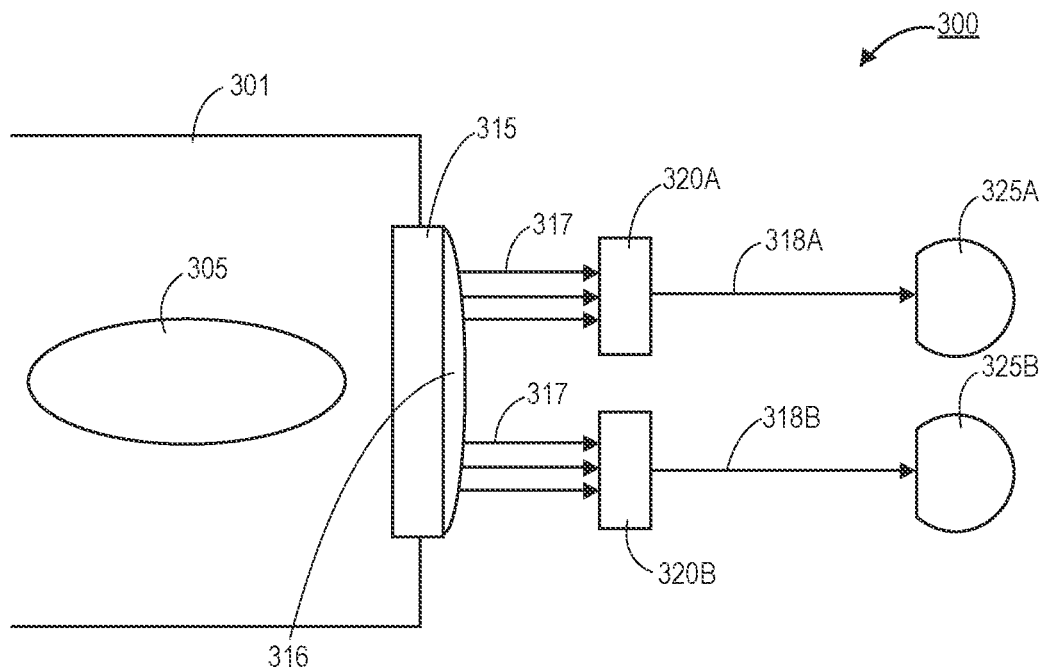
FIG. 3A is an illustration of a semiconductor processing tool with a lens on a port through the semiconductor processing tool, in accordance with an embodiment.

Referring now to FIG. 3A, a cross-sectional illustration of a semiconductor processing tool 300 is shown, in accordance with an additional embodiment. The semiconductor processing tool 300 may include a chamber 301 suitable for generating a plasma 305. The plasma 305 may be optically coupled to a first detector 325A and a second detector 325B. For example, electromagnetic radiation 317 may pass through a viewport 315 and be provided to bandpass filters 320A and 320B. The filtered electromagnetic radiation 318A and 318B may then be provided to the detectors 325A and 325B, respectively.

In an embodiment, the semiconductor processing tool 300 in FIG. 3A may be substantially similar to the semiconductor processing tool 200 in FIG. 2B, with the exception of the addition of a lens 316. In an embodiment, the lens 316 may be provided outside of the viewport 315. The lens 316 may improve optical coupling between the plasma 305 and the bandpass filters 320A and 320B. In some embodiments, lenses (not shown) may also be provided on the bandpass filters 320A and 320B in order to improve optical coupling with the detectors 325A and 325B, respectively. Additionally, one or more mirrors may be provided along the optical paths between the plasma 305 and the detectors 325A and 325B.

Figure 3B:
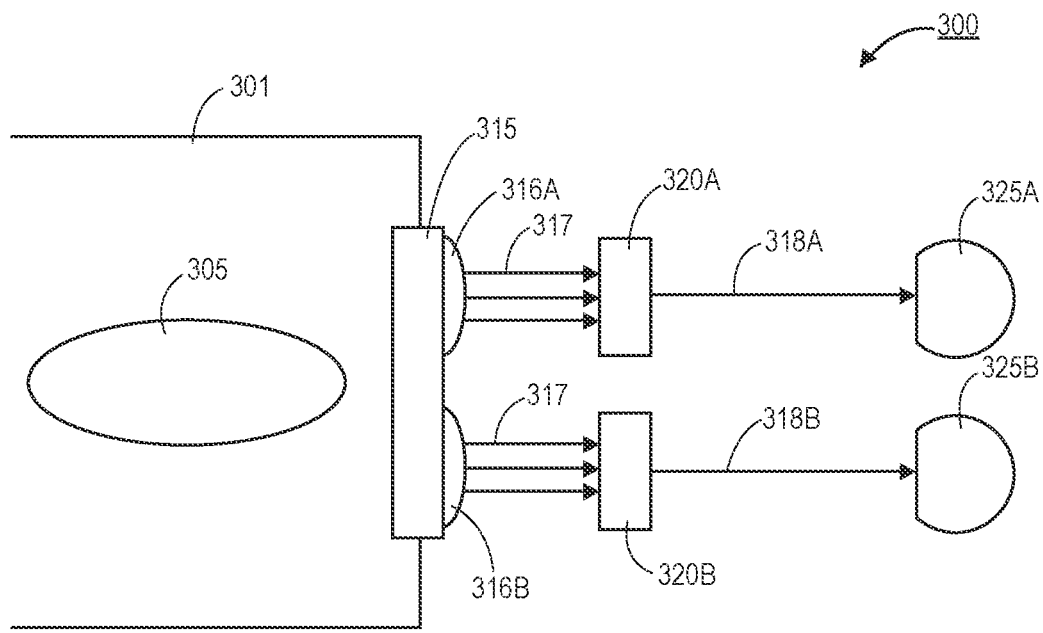
FIG. 3B is an illustration of a semiconductor processing tool with a pair of lenses on a port through the semiconductor processing tool, in accordance with an embodiment.

Referring now to FIG. 3B, a cross-sectional illustration of a semiconductor processing tool 300 is shown, in accordance with an embodiment. The semiconductor processing tool 300 in FIG. 3B may be substantially similar to semiconductor processing tool 300 in FIG. 3A, with the exception of the lens 316. Instead of providing a single lens 316 between the viewport 315 and the bandpass filters 320A and 320B, a first lens 316A is provided between the viewport 315 and the bandpass filter 320A, and a second lens 316B is provided between the viewport 315 and the bandpass filter 320B. Such a configuration may lead to improved coupling between the plasma 305 and the bandpass filters 320A and 320B than when a single lens 316 is used.

Figure 4:
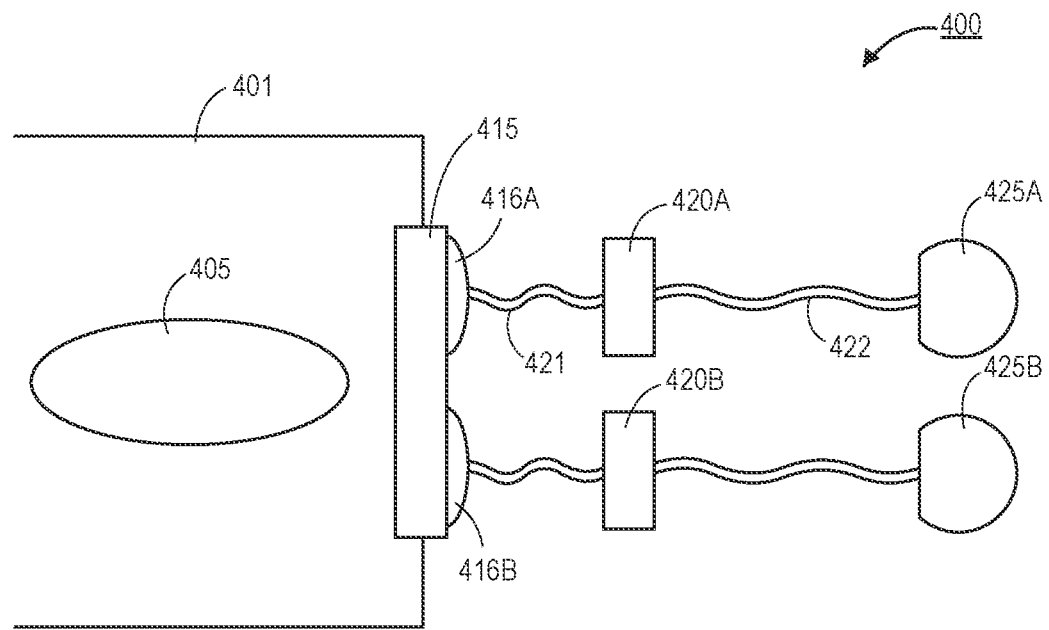
FIG. 4 is an illustration of a semiconductor processing tool with optical fibers between the port and the bandpass filter and between the bandpass filter and the detector, in accordance with an embodiment.

Referring now to FIG. 4, a cross-sectional illustration of a semiconductor processing tool 400 is shown, in accordance with an embodiment. The semiconductor processing tool 400 may comprise a chamber 401 suitable for forming a plasma 405. In an embodiment, the plasma 405 is optically coupled to a first detector 425A and a second detector 425B. A first bandpass filter 420A may be provided between the plasma 405 and the first detector 425A. A second bandpass filter 420B may be provided between the plasma 405 and the second detector 425B. In an embodiment, the bandpass filters 420A and 420B may be similar to any of the bandpass filters described in greater detail above.

In an embodiment, the plasma 405 may emit electromagnetic radiation that passes through a viewport 415. The electromagnetic radiation may be optically coupled to a first fiber optic cable 421. For example, a lens 416A or 416B may provide optical coupling into the first fiber optic cables 421. The first fiber optic cables 421 propagate the electromagnetic radiation to the bandpass filters 420A and 420B. After being filtered, the electromagnetic radiation is propagated to the detectors 425A and 425B through second fiber optic cables 422. In other embodiments, the first fiber optic cables 421 may be omitted. Alternatively, the second fiber optic cables 421 may be omitted. Additional lenses may also be provided at the interfaces between the first fiber optic cables 421 and the bandpass filters 420A and 420B, at the interfaces between the bandpass filters 420A and 420B and the second fiber optic cables 422, and/or at the interfaces between the second fiber optic cables 422 and the detectors 425A and 425B. In some embodiments, lenses 416A and 416B may be omitted.

In the embodiments described above, the light source is the plasma within the chamber of the semiconductor processing tool. However, embodiments are not limited to semiconductor processing tools that generate plasma. For example, moisture detection may be implemented in thermal chambers, transfer chambers, load locks, and the like. Instead of providing a plasma in the chamber, an antechamber is fluidically coupled to the interior of the chamber. A small plasma may then be struck in the antechamber, and the small plasma can be used as the light source. An example of such an embodiment is shown in FIG. 5.

Figure 5:
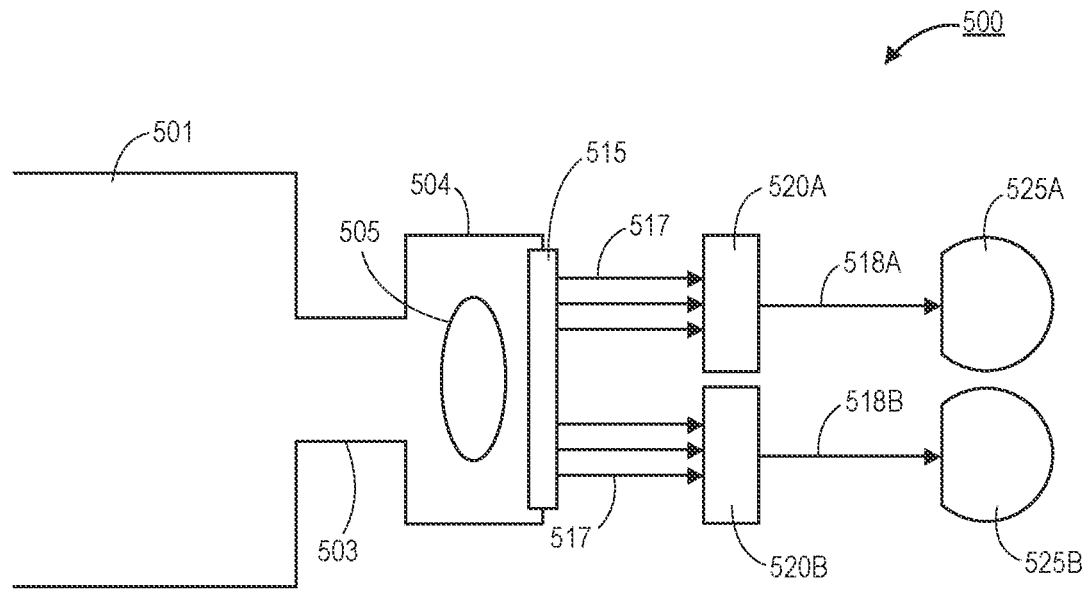
FIG. 5 is an illustration of a semiconductor processing tool that includes a plasma generation chamber fluidically coupled to the main chamber, in accordance with an embodiment.

As shown in FIG. 5, the semiconductor processing tool 500 comprises a chamber 501 and an antechamber 504. The antechamber 504 may be fluidically coupled to the chamber 501 through a port 503. The port 503 may be any standard vacuum port that is used in various processing tool architectures. In an embodiment, the antechamber 504 includes functionality to generate a plasma 505. In an embodiment, a viewport 515 may be provided as part of the antechamber 504. The viewport 515 may be a material that is transparent to electromagnetic radiation of interest. For example, the viewport 515 may comprise fused silica.

In an embodiment, the detection system outside of the viewport 515 may be similar to any of the detection architectures described in greater detail above. For example, electromagnetic radiation 517 may pass to bandpass filters 520A and 520B. The filtered electromagnetic radiation 518A and 518B may be propagated to detectors 525A and 525B, respectively. The bandpass filters 520A and 520B may have narrow passbands in order to isolate various peaks within the spectrum generated by the plasma 505. As such, the detectors 525A and 525B may be simple photodiodes or the like.

Figure 6:
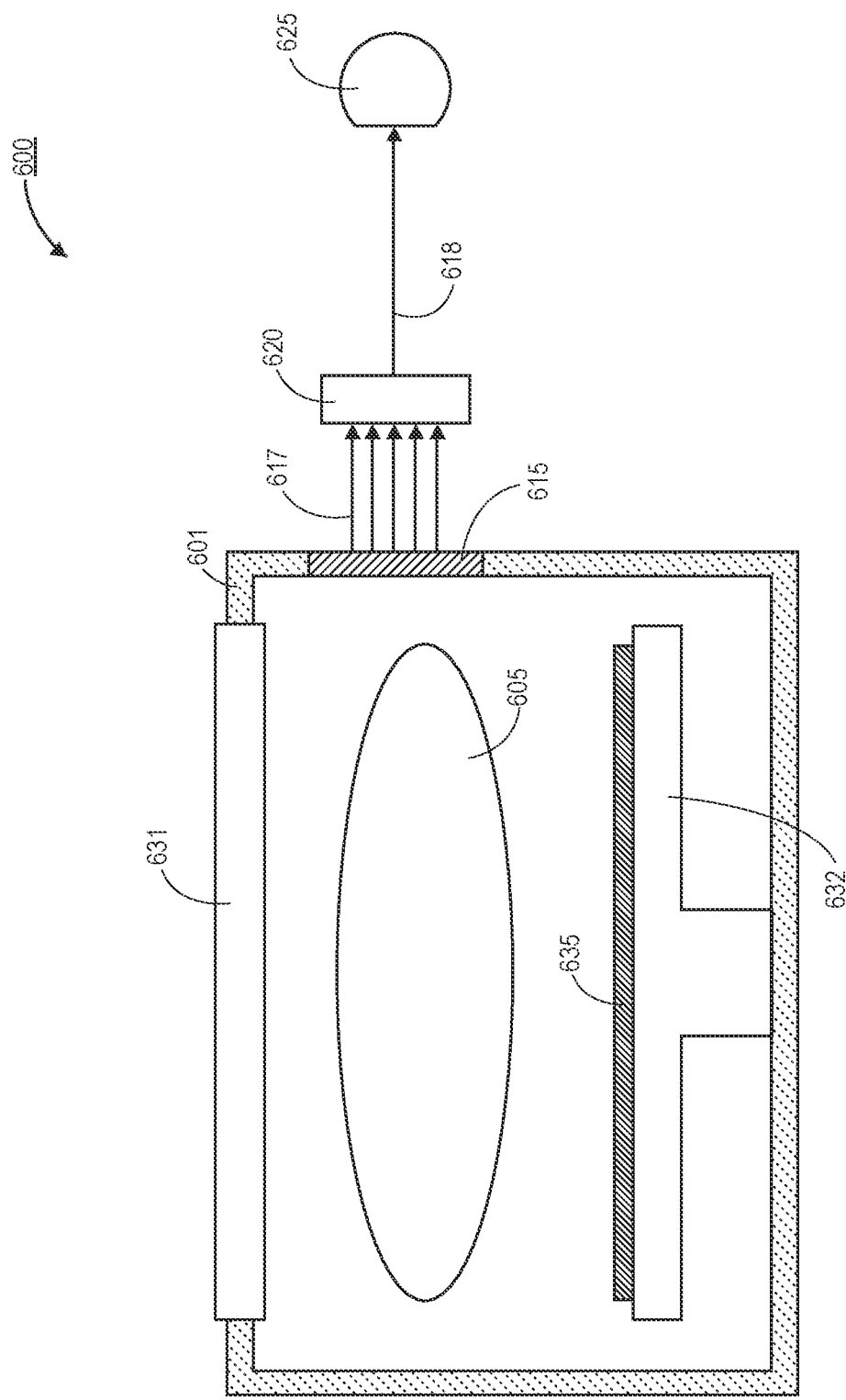
FIG. 6 is a cross-sectional illustration of a semiconductor processing tool that includes a moisture detection sensor, in accordance with an embodiment.
Figure 7:
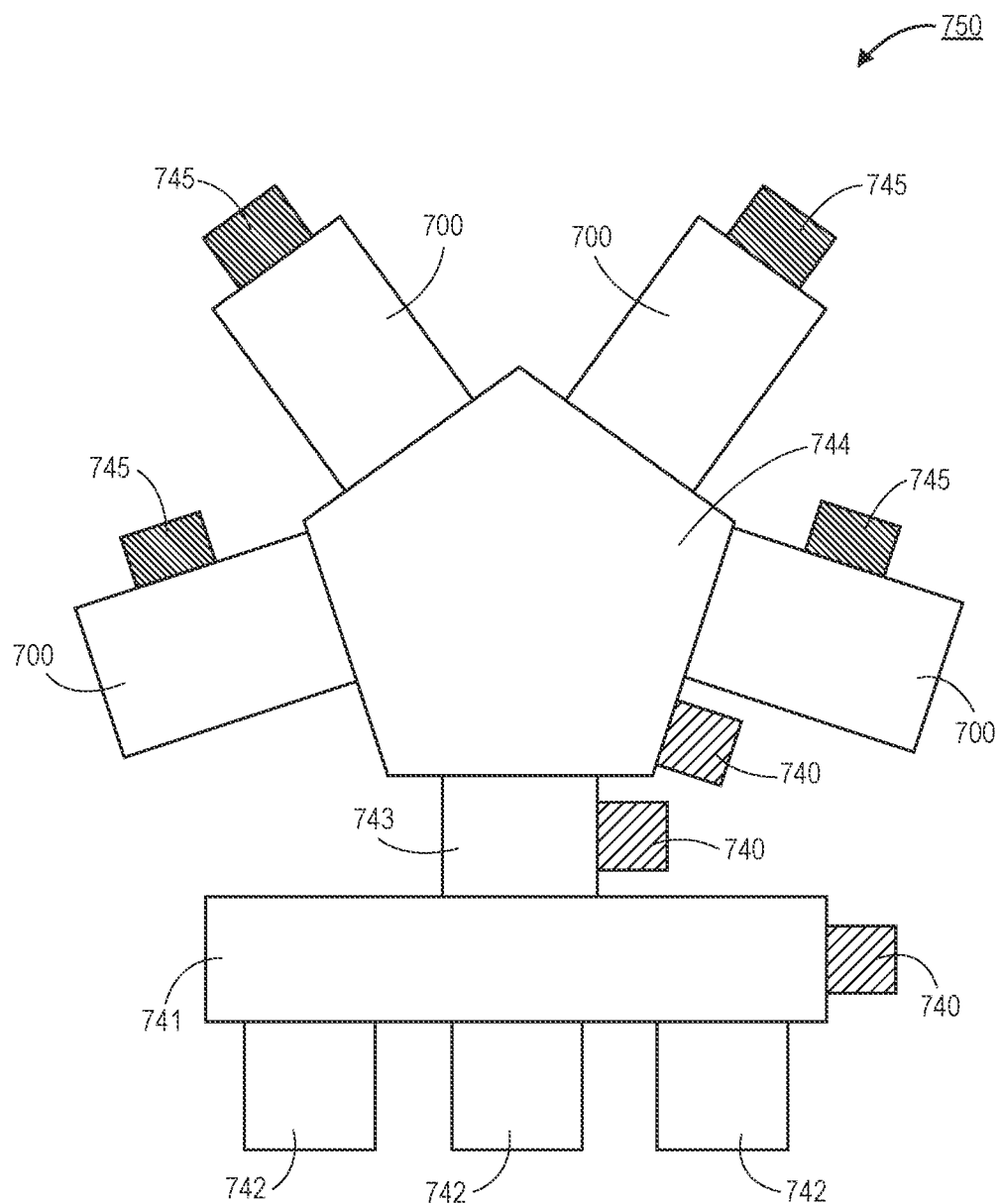
FIG. 7 is a plan view illustration of a cluster tool with a plurality of moisture detection sensors provided on different chambers of the cluster tool, in accordance with an embodiment.

Referring now to FIG. 6, a cross-sectional illustration of a semiconductor processing tool 600 is shown, in accordance with an additional embodiment. In an embodiment, the semiconductor processing tool 600 may comprise a chamber 601. In an embodiment, a support 632, such as an electrostatic chuck (ESC) or the like, may be provided in the chamber 601. The support 632 may secure a substrate 635 within the chamber 601. The substrate 635 may be a wafer or any other standard form factor. In an embodiment, a lid 631 may be provided opposite from the support 632. The chamber 601 may be configured to generate a plasma 605 between the lid 631 and the support 632.

In an embodiment, a moisture detection module may be optically coupled to the chamber 601. For example, electromagnetic radiation 617 from the plasma 605 may pass through a viewport 615 and be propagated towards a bandpass filter 620. The bandpass filter 620 may be a narrow bandpass filter in order to isolate one of the peaks in the spectrum of the electromagnetic radiation 617. For example, the passband may be centered at 309 nm in order to isolate the signal from OH that is generated from the cracking of water molecules. The filtered electromagnetic radiation 618 may then pass to a detector 625, such as a photodiode or the like.

In the embodiment shown in FIG. 6, a single filter 620 and detector 625 are shown. However, embodiments may include a semiconductor processing tool 600 that includes any of the moisture detection module architectures described in greater detail above. For example, two or more bandpass filters may be used with a similar number of detectors. Also, reference signals may be detected without the use of a filter. Further, any lens configuration, or optical coupling configuration (e.g., using fiber optic cables) may be included as part of the semiconductor processing tool 600.

Referring now to FIG. 750, a plan view illustration of a cluster tool 750 is shown, in accordance with an additional embodiment. The cluster tool 750 may include a factory interface 741. The factory interface 741 may couple front opening unified pods (FOUPs) 742 to a load lock 743. The load lock 743 couples the factory interface 741 to a transfer chamber 744. A plurality of semiconductor processing tools 700 may be coupled to the transfer chamber 744.

As can be appreciated, the moisture content within the different chambers can be different. As such, each of the chambers may be independently monitored. In the case of semiconductor processing tools 700, the tools 700 may generate a plasma that can be utilized as the light source. As such, moisture detection modules 745 similar to any of the embodiments described above without an antechamber may be used. In an embodiment, chambers without plasma generation capabilities may be monitored with moisture detection modules 740 similar to those that include antechambers. For example, moisture detection modules 740 may be similar to the embodiment described above with respect to FIG. 5. It is to be appreciated, that due to the use of low cost components and simple integration, many different moisture detection modules 740 and/or 745 may be integrated into the cluster tool 750 without significant cost increases.

Figure 8:
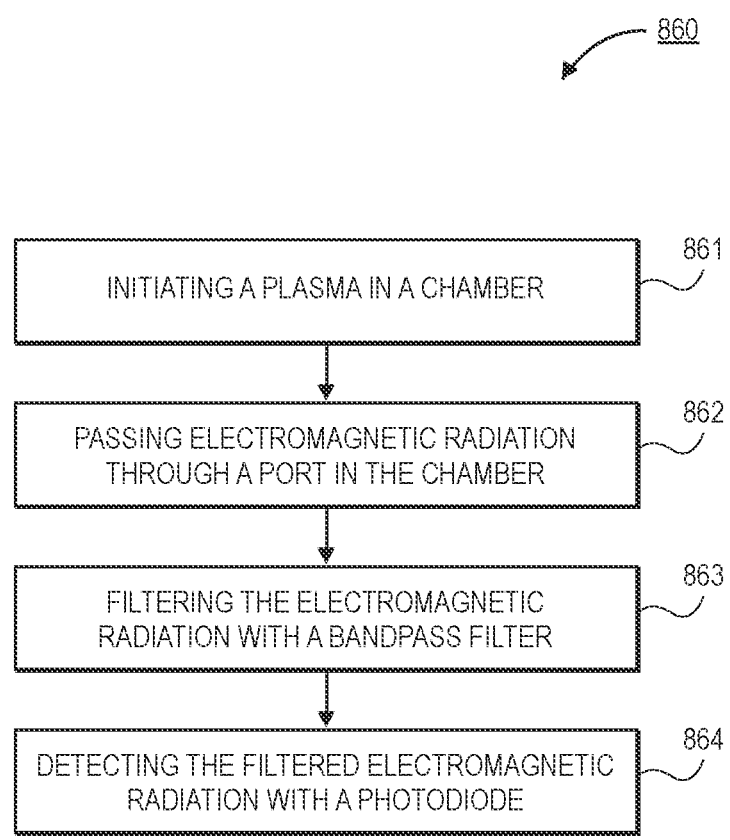
FIG. 8 is process flow diagram for a process of measuring moisture in a semiconductor processing tool, in accordance with an embodiment.

Referring now to FIG. 8, a process flow diagram of a process 860 for monitoring moisture content with a moisture detection module is shown, in accordance with an embodiment. In an embodiment, the process 860 may begin with operation 861 which comprises initiating a plasma in a chamber. The plasma may be initiated within the main chamber or within an antechamber fluidically coupled to the main chamber. The process 860 may continue with operation 862, which comprises passing electromagnetic radiation through a port in the chamber. The port may be a viewport that is transparent to electromagnetic radiation emitted by the plasma. For example, the port may comprise fused silica.

In an embodiment, the process 860 may continue with operation 863 which comprises filtering the electromagnetic radiation with a bandpass filter. The bandpass filter may be similar to any of the bandpass filters described in greater detail herein. For example, the bandpass filter may be a narrow bandpass filter with a passband that is 10 nm or less, 5 nm or less, or 1 nm or less. In a particular embodiment, the bandpass filter is centered at approximately 309 nm. In an embodiment, the process 860 may continue with operation 864, which comprises detecting the filtered electromagnetic radiation with a photodiode. The detected electromagnetic radiation can then be used in order to determine a moisture content within the chamber.

Figure 9:
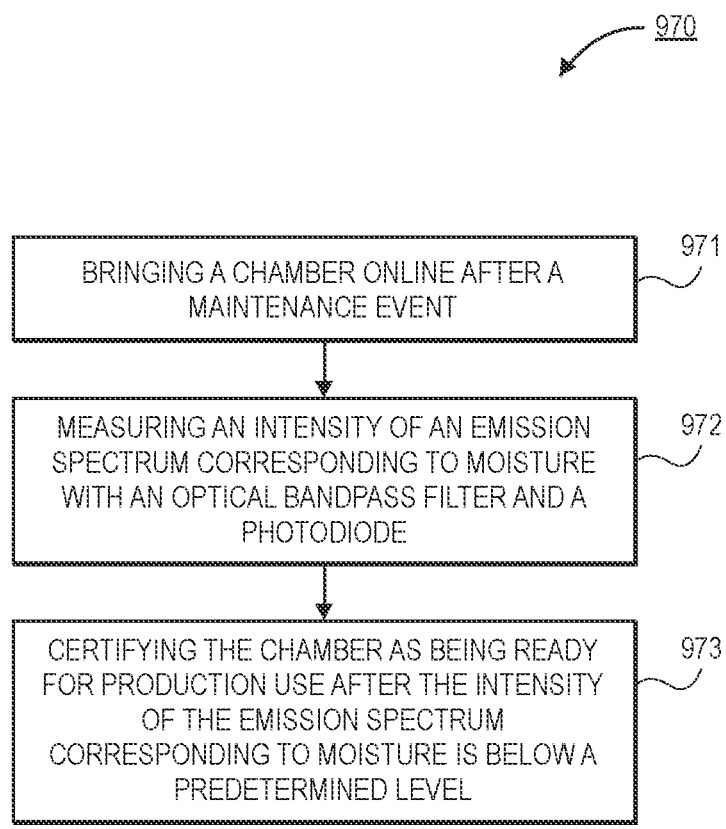
FIG. 9 is a process flow diagram for a process for certifying a semiconductor processing tool after a maintenance event.

Referring now to FIG. 9, a process flow diagram depicting a process 970 for certifying a chamber after a maintenance event is shown, in accordance with an embodiment. In an embodiment, the process 970 may begin with operation 971, which comprises bringing a chamber online after a maintenance event. Brining the chamber online may include various operations, such as pumping down the chamber, running dummy wafers, generating a seasoning coating, or the like.

In an embodiment, the process 970 may continue with operation 972, which comprises measuring an intensity of an emission spectrum corresponding to moisture with an optical bandpass filter and a photodiode. The emission spectrum corresponding to moisture may be centered at 309 nm in some embodiments. Though, other narrow bandwidths of the total spectrum may also be monitored for various purposes. In an embodiment, the bandpass filter and the photodiode may be provided in architectures similar to any of those described in greater detail herein. In some embodiments, a reference signal is also used in order to calibrate the system to changes in the transmittance of the viewport.

In an embodiment, the process 970 may continue with operation 973, which comprises certifying the chamber as being ready for production use after the intensity of the emission spectrum corresponding to moisture is below a predetermined level. At the predetermined level the moisture content is low enough that it does not negatively impact the processing within the chamber.

Due to complex interactions between gasses, the use of only bandpass filters may not be enough to determine concentrations of various elements in some embodiments. For example, if clearly separated lines are not present, a more complex algorithm can be used to calculate individual intensities based on several overlapping lines. Possible calculation options may include solving a system of equations, or a calculation based on previously measured characteristic curves.

Figure 10:
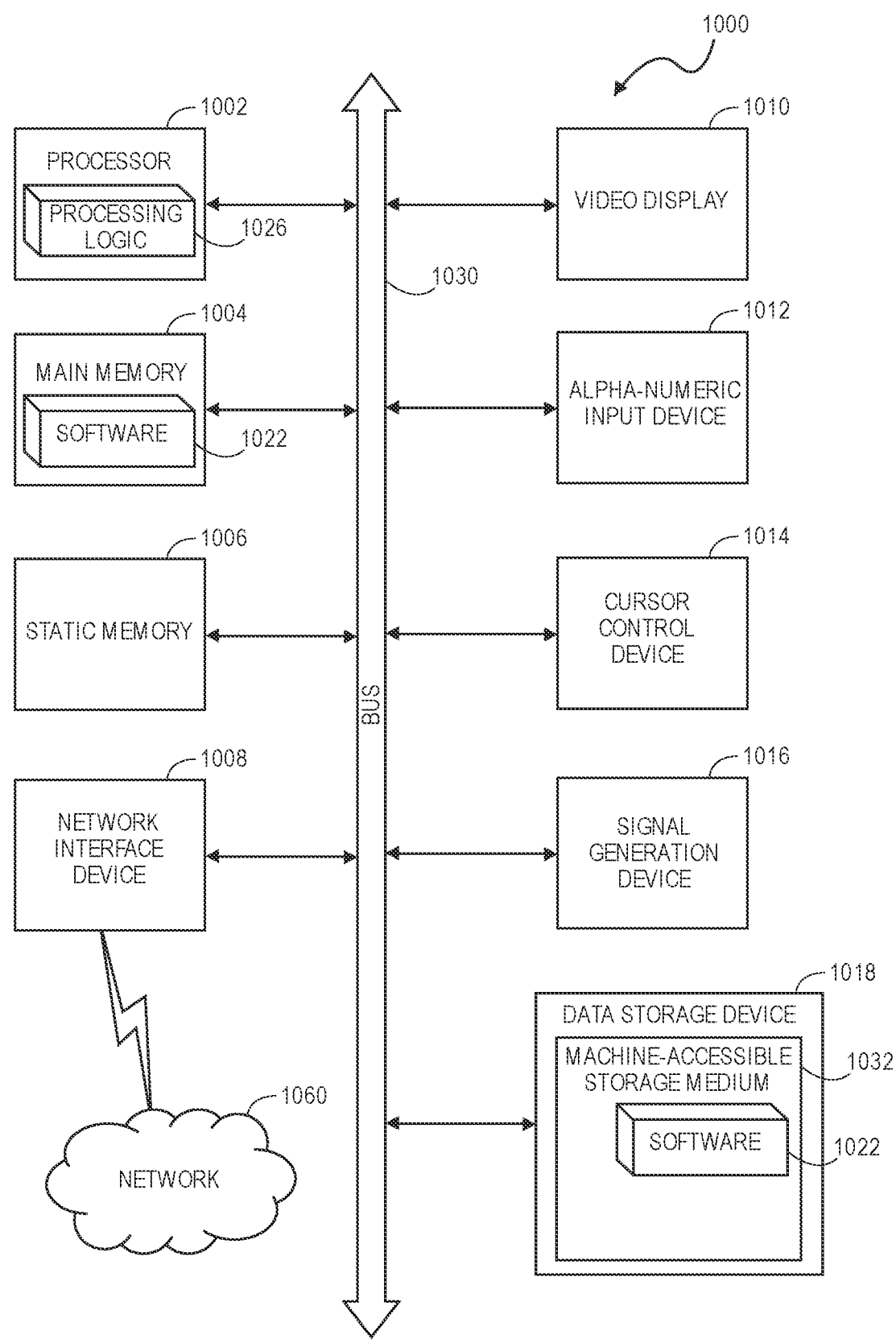
FIG. 10 illustrates a block diagram of an exemplary computer system that may be used in conjunction with a processing tool, in accordance with an embodiment.

Referring now to FIG. 10, a block diagram of an exemplary computer system 1000 of a processing tool is illustrated in accordance with an embodiment. In an embodiment, computer system 1000 is coupled to and controls processing in the processing tool. Computer system 1000 may be connected (e.g., networked) to other machines in a Local Area Network (LAN), an intranet, an extranet, or the Internet. Computer system 1000 may operate in the capacity of a server or a client machine in a client-server network environment, or as a peer machine in a peer-to-peer (or distributed) network environment. Computer system 1000 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 1000, the term "machine" shall also be taken to include any collection of machines (e.g., computers) that individually or jointly execute a set (or multiple sets) of instructions to perform any one or more of the methodologies described herein.

Computer system 1000 may include a computer program product, or software 1022, having a non-transitory machine-readable medium having stored thereon instructions, which may be used to program computer system 1000 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 1000 includes a system processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

System processor 1002 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 1002 may also be one or more special-purpose processing devices such as an application specific integrated circuit (ASIC), a field programmable gate array (FPGA), a digital signal system processor (DSP), network system processor, or the like. System processor 1002 is configured to execute the processing logic 1026 for performing the operations described herein.

The computer system 1000 may further include a system network interface device 1008 for communicating with other devices or machines. The computer system 1000 may also include a video display unit 1010 (e.g., a liquid crystal display (LCD), a light emitting diode display (LED), or a cathode ray tube (CRT)), an alphanumeric input device 1012

(e.g., a keyboard), a cursor control device 1014 (e.g., a mouse), and a signal generation device 1016 (e.g., a speaker).

The secondary memory 1018 may include a machine-accessible storage medium 1032 (or more specifically a computer-readable storage medium) on which is stored one or more sets of instructions (e.g., software 1022) embodying any one or more of the methodologies or functions described herein. The software 1022 may also reside, completely or at least partially, within the main memory 1004 and/or within the system processor 1002 during execution thereof by the computer system 1000, the main memory 1004 and the system processor 1002 also constituting machine-readable storage media. The software 1022 may further be transmitted or received over a network 1060 via the system network interface device 1008. In an embodiment, the network interface device 1008 may operate using RF coupling, optical coupling, acoustic coupling, or inductive coupling.

While the machine-accessible storage medium 1032 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A semiconductor processing tool, comprising:
   a chamber;
   a viewport through a wall of the chamber; and
   a detection module optically coupled to the viewport, wherein the detection module comprises:
      an optical bandpass filter with a passband that is up to 10 nm, the optical bandpass filter optically coupled to a light source; and
      a first detector optically coupled to the optical bandpass filter; and
      a second detector, wherein the second detector is optically coupled to the light source without an intervening optical bandpass filter.

2. The semiconductor processing tool of claim 1, wherein the passband is centered at 309 nm, and wherein the passband has a full width at half maximum (FWHM) between 1 nm and 20 nm.

3. The semiconductor processing tool of claim 1, wherein the first detector is a photodiode.

4. The semiconductor processing tool of claim 1, wherein the chamber is configured to generate a plasma, wherein the plasma is configured to be optically coupled to the detection module through the viewport.

5. The semiconductor processing tool of claim 1, wherein the viewport comprises fused silica.

6. The semiconductor processing tool of claim 1, wherein the chamber comprises an antechamber fluidically coupled to the chamber, and wherein the viewport is integrated into the antechamber.

7. The semiconductor processing tool of claim 1, further comprising:
   a lens along an optical path between the viewport and the optical bandpass filter.

8. A method for detecting moisture in a chamber, comprising:
   initiating a plasma in the chamber;
   passing electromagnetic radiation through a port in the chamber;
   filtering the electromagnetic radiation with a bandpass filter with a passband that is 10 nm wide or smaller;
   detecting the filtered electromagnetic radiation with a first detector; and
   detecting the electromagnetic radiation with a second detector without an intervening optical bandpass filter.

9. The method of claim 8, wherein the passband is centered at 309 nm.

10. The method of claim 8, wherein the first detector is optically coupled to the bandpass filter by a fiber optic cable.

* * * * *